United States Patent
Haapola et al.

(10) Patent No.: US 9,565,692 B2
(45) Date of Patent: Feb. 7, 2017

(54) METHOD OF IMPROVING CHANNEL UTILIZATION

(71) Applicants: Jussi Haapola, Ylikiiminki (FI); Tuomas Paso, Oulu (FI); Ryuji Kohno, Yokohama (JP)

(72) Inventors: Jussi Haapola, Ylikiiminki (FI); Tuomas Paso, Oulu (FI); Ryuji Kohno, Yokohama (JP)

(73) Assignee: OULUN YLIOPISTO, Oulu (FI)

( * ) Notice: Subject to any disclaimer, the term of this patent is extended or adjusted under 35 U.S.C. 154(b) by 77 days.

(21) Appl. No.: 14/472,989

(22) Filed: Aug. 29, 2014

(65) Prior Publication Data

US 2015/0063322 A1    Mar. 5, 2015

(30) Foreign Application Priority Data

Sep. 3, 2013 (FI) .................................. 20135889

(51) Int. Cl.
| | |
|---|---|
| *H04J 3/00* | (2006.01) |
| *H04W 72/10* | (2009.01) |
| *H04W 74/08* | (2009.01) |
| *H04W 72/04* | (2009.01) |
| *H04W 74/04* | (2009.01) |

(52) U.S. Cl.
CPC ......... *H04W 72/10* (2013.01); *H04W 72/0446* (2013.01); *H04W 74/04* (2013.01); *H04W 74/0875* (2013.01)

(58) Field of Classification Search
None
See application file for complete search history.

(56) References Cited

U.S. PATENT DOCUMENTS

| | | | | |
|---|---|---|---|---|
| 5,515,379 | A | * 5/1996 | Crisler | H04J 3/1694 370/347 |
| 2001/0002195 | A1 | * 5/2001 | Fellman | H04L 12/6418 370/420 |
| 2012/0063395 | A1 | * 3/2012 | Ho | H04W 72/1215 370/329 |
| 2013/0195083 | A1 | * 8/2013 | Kim | H04W 72/0446 370/336 |

FOREIGN PATENT DOCUMENTS

| | | |
|---|---|---|
| EP | 2 227 045 A1 | 9/2010 |
| EP | 2 282 599 A1 | 2/2011 |
| WO | 2005/053243 A2 | 6/2005 |
| WO | 2010/018523 A2 | 2/2010 |

OTHER PUBLICATIONS

FI Search Report, dated Jun. 19, 2014, from corresponding FI application.

\* cited by examiner

*Primary Examiner* — Duc C Ho
(74) *Attorney, Agent, or Firm* — Young & Thompson

(57) ABSTRACT

Improvements on latency are achieved for highest priority messaging and channel utilization in a time-slotted access channel structure. New superframe structures are presented where scheduled, but unused access slots can be utilized by secondary nodes. The messaging is accomplished by defining user priorities for nodes and the nodes sensing an ongoing transmission in the network. The time slotted channel access structure has at least one access phase which is divided into access slots. In the beginning of the access phase the nodes sense if a highest priority transmission exist and if not, another node with a lower user priority may initiate transmission.

19 Claims, 3 Drawing Sheets

METHOD OF IMPROVING CHANNEL UTILIZATION

FIELD OF THE INVENTION

The present invention relates to messaging in a computer network and more specifically to a method and a computer program with an enhancement to prioritize and intensify time-critical messaging as defined in the preambles of the independent claims.

BACKGROUND OF THE INVENTION

Various different wired or wireless computer network systems and protocols exist for exchanging data between computing devices, nodes, connected to the network. Some network systems are based on using beacon signals in coordinating the data communication between the nodes. The beacon signal is generally a specific data transmission sent periodically carrying network specific information for the nodes connected or in vicinity of the computer network.

The problem and the current invention are relevant for many network systems. Let us consider an example: The Institute of Electrical and Electronics, IEEE, defines a standard for a wireless network 802.11 which is a set of medium access control (MAC) and physical layer, (PHY) specifications for implementing a wireless local area network, WLAN aka Wi-Fi. Another example of a standard defined by IEEE is 802.15.6 defining MAC and PHY specifications for packet-based short-range communications in a wireless body area network, WBAN. The MAC layer defines differentiated access phases for exclusive, scheduled and random access communication in a superframe-structured network, where a superframe is bounded by two beacon signals. In one superframe there can be maximum of two phases each (exclusive, scheduled and random access communication) and a contention access period. Structure of the superframe is explained in detail later on.

IEEE 802.15.6 defines two exclusive access phases, EAP, for highest priority communications.

One of the drawbacks of the solutions defined in the current standards is that those are not able to provide delay guarantees for time-critical applications, especially if a significant portion of the superframe duration is not reserved for EAPs. However, if long EAPs are allocated to the superframe but highest priority communications remain minimal or zero, there are less opportunities for other than the highest priority communications to access the medium, since only the highest priority communications are allowed to transmit during EAPs.

Current standards do not allow transmissions in the scheduled, but unused slots in the scheduled access phase. Z-MAC: a Hybrid MAC for Wireless Sensor Networks by Manesh Aia, Ajit Warrier, Jeongki Min, Injong Rhee, Department of Computer Science, North Carolina State University tries to solve the problem of allocated but unused slots by introducing a carrier sense multiple access, CSMA/ time division multiple access, TDMA hybrid protocol for wireless sensor networks. According to the Z-MAC the nodes always perform carrier sensing and transmit only if the channel is clear. Slot owners are given a higher priority bit—they are given an earlier chance to transmit than non-owners. Therefore, if the slot owner does not have data to transmit, the non-owners can "steal" the slot by utilizing a contention-based CSMA channel access mechanism. Due the carrier-sensing feature the Z-MAC is suitable only for communication systems utilizing narrowband transmissions. Therefore it cannot be utilized as a general MAC layer scheme for standards utilizing broadband physical layers. Furthermore, the Z-MAC does not support application-prioritized traffic, such as highest priority transmissions.

BRIEF DESCRIPTION OF THE INVENTION

The object of the present invention is to provide a low-latency, highest priority messaging for time-critical communications in beacon mode. Furthermore, the invention enables utilization of scheduled, but unused access phases thus increasing channel throughput. The objects of the present invention are achieved with a method, a system, a device and a computer program product.

The preferred embodiments of the invention are disclosed in the dependent claims.

According to one embodiment of the invention a method of improving channel utilization in a time slotted channel access structure in a network is presented. The method comprises defining user priorities for the nodes 12 and the nodes 12 having means for sensing an ongoing transmission in the network 10. The time slotted channel access structure comprising, at least one access phase which is divided into access slots. In the beginning of the access phase the nodes 12 sense if a highest priority transmission exist and if not: another node with a lower user priority may initiate transmission.

According to another embodiment of the invention the method further comprises assigning the access slots to the nodes 12 connected to the network 10. After sensing that no highest priority transmission exists sensing if a transmission from the assigned node exists after sensing that no highest priority transmission exist, sensing if a transmissions exist from the assigned node; and if not: another node may initiate transmission.

According to another embodiment of the invention the initiation of the transmission procedure comprises contending for channel access.

According to another embodiment of the invention the initiation of the transmission the transmission comprises avoiding collisions between the nodes.

According to another embodiment of the invention a beacon frame and at least one access phase forms a superframe.

According to another embodiment of the invention the superframe comprises at least one access phase mapped for the connected nodes and at least one random access phase for the connected nodes.

According to another embodiment of the invention the superframe comprises at least one preamble which all connected nodes are capable of sensing.

According to an embodiment of the invention the methods are implemented on a computer program product, readable by a computer and encoding instructions for executing.

According to an embodiment of the invention the methods are implemented on the node 12.

According to an embodiment of the invention the methods are implemented on the node 12 and the hub 11.

According to an embodiment of the invention the node device 12 operative in a time slotted channel access structure in a network, comprises means for storing user priority in memory 21 and means for sensing a transmission utilizing COM 20. The time slotted channel access structure comprising, at least one access phase which is divided into number of access slots. In case the user priority stored in the node is not the highest user priority the node senses in the beginning of the access phase if a transmission from the highest user priority node exist. If no transmission is sensed the node device may initiate transmission.

According to another embodiment of the invention the node device 12 operative in a time slotted channel access structure in a network acts as a hub device 11 coordinating the channel access, comprising means for storing user priorities of the connected nodes in memory 21. The hub device defines and coordinates the time slotted channel access structure comprising at least one access phase which is divided into number of access slots allowing nodes 12 with not the highest user priority to initiate transmission if a transmission from the highest user priority node does not exist.

The present invention is based on time slotted channel access structure, ability to sense a start of a transmission to avoid overlapping transmissions (e.g. preamble or pilot signals) and support for prioritized traffic.

The present invention has the advantage that it allows transmission of packets of highest priority in every scheduled and unscheduled time slot by using specific time slot structures and it allows the transmission of packets of a non-priority node on unused access periods by priority users by using specific time slot structures.

BRIEF DESCRIPTION OF THE FIGURES

In the following the invention will be described in greater detail, in connection with preferred embodiments, with reference to the attached drawings, in which.

DETAILED DESCRIPTION OF SOME EMBODIMENTS

The following embodiments are exemplary. Although the specification may refer to "an", "one", or "some" embodiment(s), this does not necessarily mean that each such reference is to the same embodiment(s), or that the feature only applies to a single embodiment. Single features of different embodiments may be combined to provide further embodiments.

In the following, features of the invention will be described with a simple example of a system architecture in which various embodiments of the invention may be implemented. Only elements relevant for illustrating the embodiments are described in detail. Various implementations of the information system comprise elements that are generally known to a person skilled in the art and may not be specifically described herein.

Figure 1:
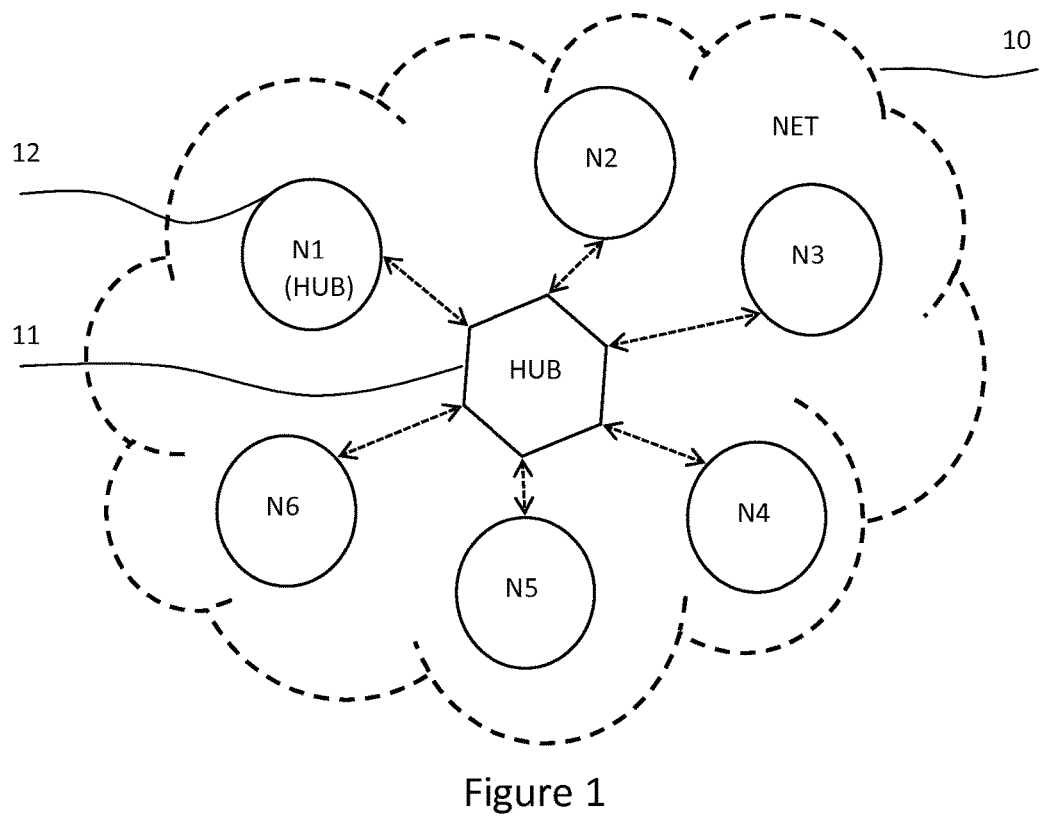
FIG. 1 illustrates a simplified example network.

FIG. 1 illustrates an exemplary network 10 in which an embodiment of the present invention may be implemented. The shown network 10 comprises nodes 12 (N1-N6) connected to the network 10. The number of the nodes 12 may change from one to many depending on the implementation and used technologies. FIG. 1 further illustrates a hub 11 (HUB) for connecting the nodes 12 together and forming a network segment. The hub 11 can be a dedicated hub device or any of the nodes 12 can act as the hub 11, too.

The network 10 represents here any combination of hardware and software components that enables a process in one communication endpoint to send or receive information to or from another process in another, remote communication endpoint. The network 10 may be, for example, a body area network, a personal area network, a local area network, a home network, a storage area network, a campus network, a backbone network, a cellular network, a metropolitan area network, a wide area network, an enterprise private network, a virtual private network, a private or public cloud or an internetwork, or a combination of any of these.

Figure 2:
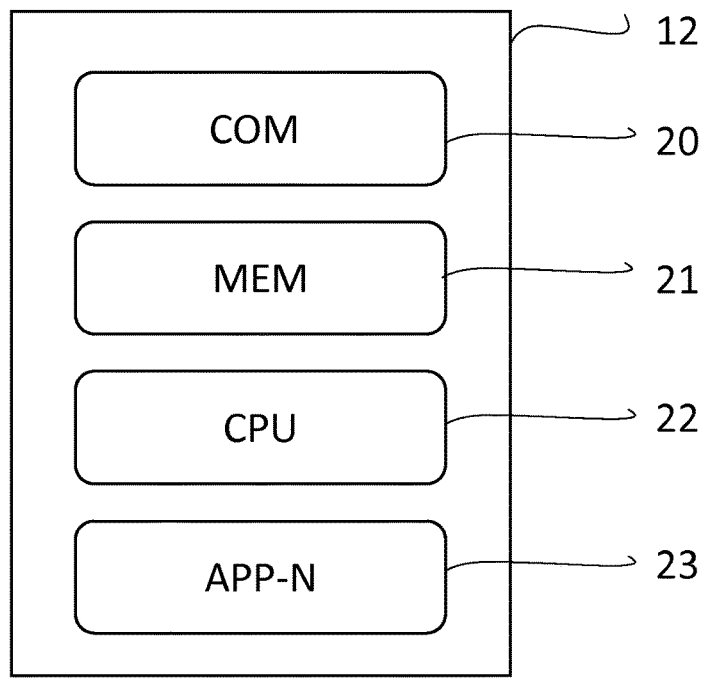
FIG. 2 illustrates a simplified exemplary device for implementing the invention.

FIG. 2 illustrates a simplified block diagram of the node 12. At least one of the nodes 12 comprises a node application 23 (APP-N). The node application 23 is, or may be stored in a memory 21 (MEM) of the node 12 and provides instructions that, when executed by a processor unit 22 (CPU) of the node 12 performs the functions described herein. The memory unit 21 may comprise volatile or non-volatile memory, for example EEPROM, ROM, PROM, RAM, DRAM, SRAM, firmware, programmable logic, etc. The node application 23 may be "user-controlled" meaning that the node 12 in which the application is executed may comprise a user interface and the user may control execution of the application by means of the user interface. The user may thus initiate and terminate running of the application, provide commands that control the order of instructions being processed in the node 12. The node 12 may be for example a laptop, desktop computer, graphics tablet, cellular phone, wearable computing device, portable gaming device, sensor unit, body sensor unit, sender unit, heart rate monitor, insulin level monitor, etc.

At least one node 12 also comprises a communication unit 20 (COM) for sending and receiving messages accessible to the node application 23. The node application may thus apply the communication unit 20 to communicate with the hub 11 connected to the network 10. The communication unit 20 may utilize various communications channels over wireless or wired connection for sending and receiving messages.

The communication unit 20 with at least one input unit for inputting data to the internal processes of the node 12 and at least one output unit for outputting data from the internal processes of the node 12. The communication unit 20 of the node 12 may also comprise means for network connectivity. If a line interface is applied, the communication unit 20 typically comprises plug-in units acting as a gateway for information delivered to its external connection points and for information fed to the lines connected to its external connection points. If a radio interface is applied, communication unit 20 typically comprises a radio transceiver unit, which includes a transmitter and a receiver, and is also electrically connected to the processing unit 20. The transmitter of the radio transceiver unit receives a bit stream from the processor unit 22, and converts it to a radio signal for transmission by the antenna. The node 12 may also comprise many other components like, battery or other power source etc. not depicted for simplicity.

Embodiments of this invention may be implemented with the node 12 described in FIGS. 1 and 2.

The processor unit 22, the memory unit 21, and the communication unit 20 are electrically interconnected to provide means for systematic execution of operations on received and/or stored data according to predefined, essentially programmed processes of the node 12. These operations comprise the means, functions and procedures described herein for the node 12. The units may exist in one physical element or be networked for distributed operations.

In general, various embodiments of the node 12 may be implemented in hardware or special purpose circuits, software, logic or any combination thereof. Some aspects may be implemented in hardware, while some other aspects may be implemented in firmware or software, which may be executed by a controller, microprocessor or other computing apparatus. Software routines, which are also called as program products, are articles of manufacture and can be stored in any device-readable data storage medium and they include program instructions to perform particular tasks.

Figure 3:
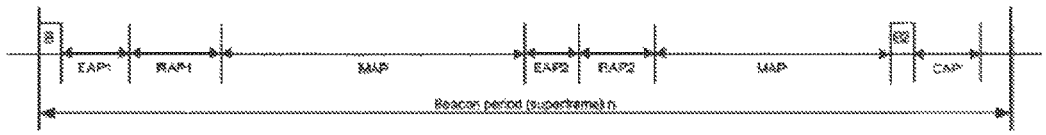
FIG. 3 illustrates an exemplary super frame.

FIG. 3 illustrates an exemplary superframe structure known for example from the current version of IEEE Std 802.15.6 with possible access phases within the superframe. All access phases are optional.

B indicates a beacon frame transmitted by the hub 11 at the beginning of the superframe. The beacon frames contain information about the network and the beacon frames are transmitted by the hub 11 periodically to announce the presence of the network 10.

EAP1 indicates the exclusive access phase 1 during which only the highest user priority traffic may be transmitted. During this access phase the traffic of the highest user priority may contend for channel access by utilizing either carrier sense multiple access, CSMA with collision avoidance, CSMA/CA or slotted Aloha, S-Aloha or other feasible means for avoiding collisions.

The carrier sense multiple access with collision avoidance, CSMA/CA is a media access method, in which the node 12 verifies the absence of other traffic before transmitting on a shared transmission medium. For example the S-Aloha utilizes discrete timeslots where a node can send only at the beginning of a time slot reducing collisions. It is clear for a man skilled in the art that these and other known means for avoiding/reducing collisions can be used as often defined by a networking standard.

RAP1 indicates a random access phase 1, during which the traffic of all the nodes 12 with any user priority may contend for the channel access by utilizing CSMA/CA, S-Aloha or other feasible means for avoiding collisions.

MAP indicates a managed access phase, where the hub 11 defines all communication methods. The nodes 12 transmit during this access phase without using CSMA/CA, S-Aloha or other feasible means for avoiding collisions.

EAP2 indicates an exclusive access phase similar to EAP1.

RAP2 indicates a random access phase similar to RAP1.

B2 indicates an optional beacon frame 2 transmitted by the hub 11 and it is present if the immediate following contention access period CAP has non-zero length.

CAP indicates a contention access period during which all the nodes 12 with any user priority may contend for channel access by utilizing CSMA/CA, S-Aloha or other feasible means for collision detection.

The user priority values for prioritizing medium access of frames may for example be determined based on the designation of traffic e.g. from 0 to 7, 0 being the lowest priority (background data) and 7 the highest (emergency data).

Term "sensing" means capability of detecting a start of a transmission e.g. pilot signals, specific preamble sequences, energy detection etc. Clear channel assessment CCA or data sensing, both of which are physical layer implementation-dependent procedures, can be used.

Term "packet" means a frame, protocol service data unit, MAC service data unit or any sequence of bits handled by the MAC layer.

Figure 4:
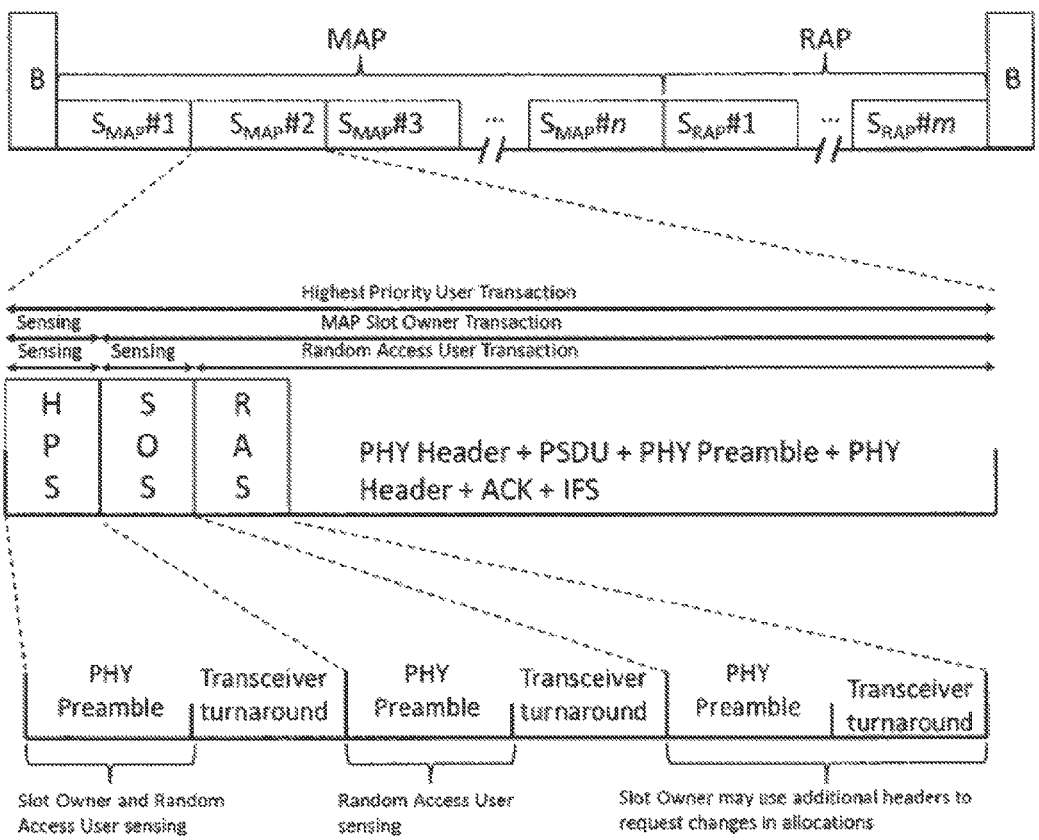
FIG. 4 illustrates the exemplary superframe with access phases and slot structure.

FIG. 4 illustrates one exemplary embodiment of the current invention. For simplicity only one MAP and RAP are illustrated in the superframe. The MAP and the RAP are divided into integral number of slots of equal size and denoted by $S_{MAP}\#1$ to $S_{MAP}\#n$ and as $S_{RAP}\#1$ to $S_{RAP}\#m$, respectively. It is to be noted that the number of the MAPs and the RAPs may be different from each other's. Division between the MAP and the RAP is based on the number of the nodes 12 requiring scheduled allocation in every superframe and the superframe period. Each node 12 may be allocated a number of slots within the superframe, and they form the MAP part of the superframe. The slots not allocated for any of the nodes 12 are considered to belong to the RAP and they form the RAP part of the superframe.

During the MAP period each MAP slot is conceptually divided into four parts (MAP slot $S_{MAP}\#1$ in FIG. 4 as an example):

High Priority Start HPS. When only the highest priority packets are allowed to start transmitting at the beginning of this part. The nodes 12 or the hub 11 with packets of lower priority shall sense the channel during HPS.

Slot Owner Start SOS. If no transmission was detected during the HPS part, the slot owner may start its transmission at the beginning of the SOS part. Other than the owner nodes 12 and the hub 11 with outstanding packets may sense the channel during the SOS part.

Random Access Start RAS. If no transmission was detected either in the HPS or the SOS parts, the nodes 12 or the hub 11 with outstanding packets may contend for the channel access and if they win—initiate their transmission at the beginning of the RAS part.

The fourth part of the MAP slot consists of the data transaction including at least some of the following components:

PHY header—a physical layer specific sequence of bits which can also be of zero length.

Physical layer service data unit PSDU containing a, possibly coded, MAC header and payload fields.

PHY preamble is a physical layer specific synchronization sequence.

Acknowledgement ACK containing the necessary MAC header and payload elements for acknowledging transmissions and it may be omitted if acknowledgement procedure is not utilized.

Interframe spacing IFS acting as a guard time against clock offsets.

Transceiver turnaround takes into account, on the transmitter side, the time required for changing transceiver state from transmit mode TX to receive mode RX and, on the sensing side, the time required for changing the transceiver state from receive mode RX to transmit mode TX. The value of transceiver turnaround greater of TX to RX or RX to TX times.

Some embodiments may omit some elements due to technology used. For example if DSSS PHY is used, the PHY preamble may exist or in some optimizations might be omitted due to PHY header structure.

During the MAP slot the slot owner may use the additional available PHY preamble and turnaround times, enabled by the RAS part, to communicate implementation-specific management information (e.g. information elements or requests to change allocation) to a recipient. The slot structure in a RAP slot is different from the MAP slot structure described in FIG. 4.

Figure 5:
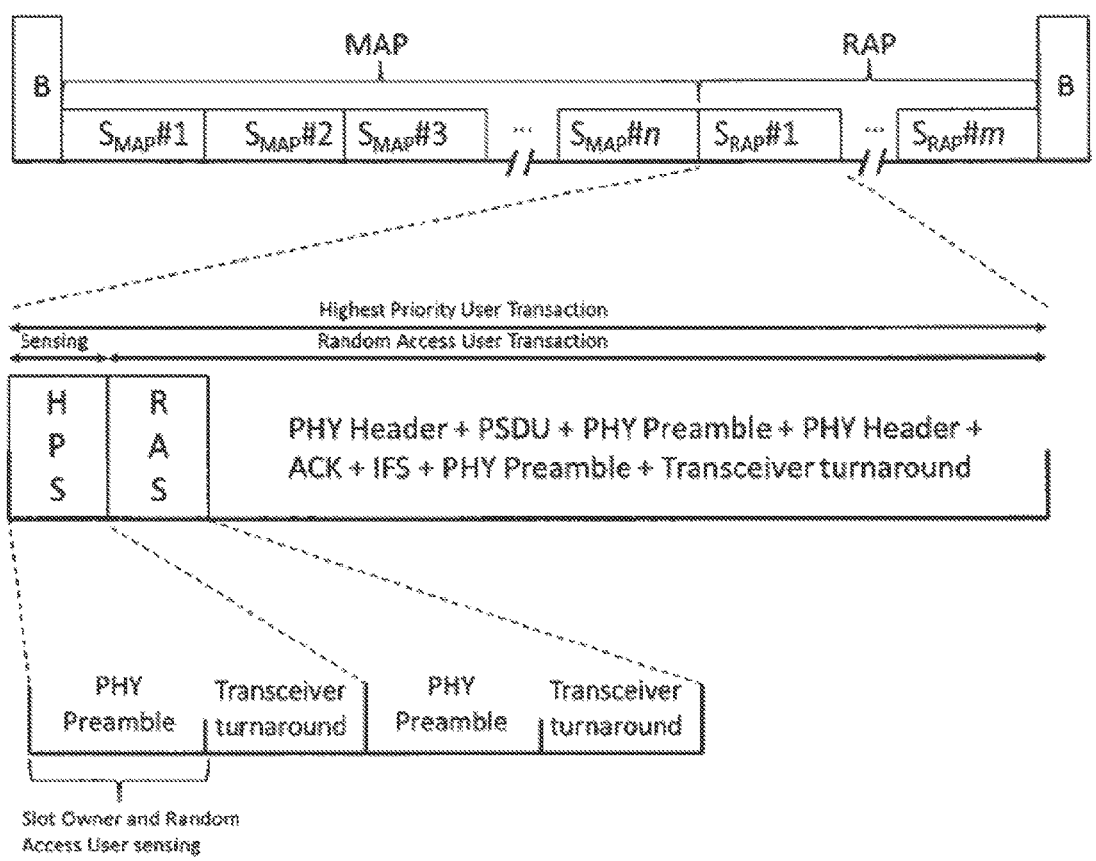
FIG. 5 further illustrates the exemplary superframe with access phases and slot structure.

FIG. 5 depicts another embodiment of the current invention. For simplicity only one MAP and RAP are illustrated in the superframe. The MAP and RAP are divided into integral number of slots of equal size and denoted by $S_{MAP}\#1$ to $S_{MAP}\#n$ and as $S_{RAP}\#1$ to $S_{RAP}\#m$, respectively. It is to be noted that the number of the MAPs and the RAPs may be different from each other's. Division between the MAP and the RAP is based on the number of the nodes 12 requiring scheduled allocation in every superframe and the superframe period. Each node 12 may be allocated a number of slots within a superframe, and they form the MAP part of the superframe. The slots not allocated for any node 12 are considered to belong to the RAP and they form the RAP part of the superframe.

Since there are no slot owners for RAP slots there is no need for the Slot Owner Start SOS and the RAS part occurs immediately after the HPS part. During the RAP period each RAP slot is conceptually divided into three parts (RAP slot $S_{RAP}$#1 in FIG. 5 as an example):

High Priority Start HPS. When only the highest priority packets are allowed to start transmission at the beginning of this part. Nodes 12 or the hub 11 with packets of lower priority shall sense the channel during HPS.

Random Access Start RAS. If no transmissions were detected in the HPS, nodes 12 or the hub 11 with outstanding packets may contend for channel access and if they win initiate their transmission at the beginning of the RAS part.

The third part of the RAP slot consists of the data transaction including at least some of the following components:

PHY header—a physical layer specific sequence of bits which can be of zero length.

Physical layer service data unit PSDU containing the possibly coded MAC header and payload fields.

PHY preamble is a physical layer specific synchronization sequence.

Acknowledgement ACK containing the necessary MAC header and payload elements for acknowledging transmissions and it may be omitted if acknowledgement procedure is not utilized.

Interframe spacing IFS acting as a guard time against clock offsets.

Transceiver turnaround takes into account, on the transmitter side, the time required for changing transceiver state from transmit mode TX to receive mode RX and, on the sensing side, the time required for changing the transceiver state from receive mode RX to transmit mode TX. The value of transceiver turnaround greater of TX to RX or RX to TX times.

Another PHY preamble and transceiver turnaround. Since there are no slot owners is the RAP part of the superframe, the SOS part of the time slot is not present. Therefore additional PHY preamble and transceiver turnaround times are needed. This extension cannot be used for transmitting additional data bits, but it may be used for communicating implementation-specific management information.

EXAMPLE 802.15.6

Different PHYs may have different requirements on the PHY preamble. For example, the IEEE standard 802.15.6 defines three alternative physical layers, one for narrowband, one for ultra wideband UWB and one for human body communications HBC. The narrowband physical layer provides CCA capability and two channel number specific preamble sequences. The UWB physical layer may provide CCA and utilizes length 63 Kasami sequences in construction of the preamble sequence. The HBC physical layer uses a 64-bit code sequence repeated four times and a frequency shift code to generate the preamble.

The current invention and the embodiments are applicable most preferably to various kinds of hub-based networks and protocols. The invention is applicable in any topology capable of centralized or distributed coordination e.g. PAN, BAN, LAN, HAN, WAN (wireless or wired) etc. The slot structures explained here can also be utilized in ad-hoc networks. For example, in discrete and dynamic spatial reuse TDMA system a TDMA slot structure could be similar when lower latency for time-critical applications could be offered. The current invention applies to any kind of network that is able to agree/construct/declare/share/inform of on a common slot structure with sufficient precision to enable differentiated access as explained in this disclosure.

Term "hub" is a term used by IEEE Std 802.15.6, other terms exist like coordinator, PAN coordinator, sink, base station, access point etc.

Let us now consider an example where embodiments of the current invention are implemented on IEEE standard 802.15.6 for Wireless Body Area Networks WBAN. WBAN is a short-range, wireless communications in the vicinity of, or inside, a human body (but not limited to humans). It uses existing industrial scientific medical (ISM) bands as well as frequency bands approved by national medical and/or regulatory authorities. The PDF of this standard is available at http://standards.ieee.org/about/get/802/802.15.html.

In IEEE 802.15.6 there are many possible alternative superframe structures.

Looking back at FIG. 3, any combination of RAP(s), MAP(s) and CAP are valid options. For example, these superframe configurations can be used in embodiments of the current invention:

RAP 1-MAP-RAP2-MAP
RAP1-MAP-RAP2-MAP-B2-CAP
RAP1-MAP
Single RAP and MAP According to an embodiment of the current invention in a single random access phase RAP and single mapped access phase MAP is used. The superframe may start with a random access phase RAP or mapped access phase MAP. If a RAP is positioned before MAP all nodes 12 with at least a single MAP allocation either have to stay awake during the entire RAP and the portion of the MAP before their allocation or they may sleep during the RAP and wake up just before their scheduled MAP allocation. On the other hand, if the MAP is positioned before the RAP all nodes 12 with MAP allocations may sleep the rest of the superframe after their last allocation. The hub 11 is always awake and if nodes need to communicate in a particular superframe they will have to be awake to receive the superframe's corresponding beacon frame. Furthermore, should a nodes's 12 transmission fail during its MAP allocation for any reason, the node 12 may contend for a retransmission in the following unused MAP allocations or in the RAP potentially reducing retransmission delay.

Multiple RAPs and/or MAPs

In another embodiment more than one MAP and RAP are utilized. Multiple instances of RAP and MAP in one superframe enable a more even distribution of MAP allocations for the nodes 12 and the hub 11. Multiple MAPs are especially useful for nodes 12 or the hub 11 if multiple allocations per superframe are required (e.g. due to high and constant packet inter arrival rate or low-latency requirement).

The presented invention enables a low-latency, highest priority messaging for time-critical communications in beacon mode. Furthermore, the invention enables utilization of scheduled, but unused access slots by secondary users which enables higher fidelity of quality of experience to system user by providing more frequent opportunities to retransmitting garbled data or transmitting extra data due to sudden increase in the system user's traffic.

While various aspects of the invention have been illustrated and described as block diagrams, message flow diagrams, flow charts and logic flow diagrams, or using some other pictorial representation, it is well understood that the illustrated units, blocks, device, system elements, procedures and methods may be implemented in, for example, hardware, software, firmware, special purpose circuits or logic, a computing device or some combination thereof.

It is apparent to a person skilled in the art that as technology advances, the basic idea of the invention can be implemented in various ways. The invention and its embodiments are therefore not restricted to the above examples, but they may vary within the scope of the claims.

The invention claimed is:

1. A method of improving channel utilization in a time slotted channel access structure in a network, the method comprising;
defining a user priority for an outstanding packet in a node;
based on the user priority defining a priority for the node selected from a highest priority node to a node with a lower user priority;
sensing a transmission;
the time slotted channel access structure comprising, at least one access phase;
dividing the access phase into number of access slots;
sensing in the beginning of the access phase if a transmission from the highest priority node exist;
if no transmission is sensed the node with the lower user priority may initiate transmission.

2. The method according to claim 1, further comprising;
assigning the access slots to the nodes connected to the network;
after sensing that no transmission from the highest priority node exists, sensing if a transmissions from the assigned node exists; and
if no transmission is sensed another node may initiate transmission.

3. The method according to claim 1, further comprising defining a beacon frame and at least one access phase forming a superframe.

4. The method according to claim 3, wherein said superframe has at least one access phase mapped for the connected nodes and at least one random access phase for the connected nodes.

5. The method according to claim 3, wherein said superframe has at least one preamble which all connected nodes are capable of sensing.

6. A non-transitory computer-readable storage medium encoding instructions for executing a method, comprising:
defining a user priority for an outstanding packet in a node;
based on the user priority defining a priority for the node selected from a highest priority node to a node with a lower user priority;
sensing a transmission;
the time slotted channel access structure comprising, at least one access phase;
dividing the access phase into number of access slots;
sensing in the beginning of the access phase if a transmission from the highest priority node exist;
if no transmission is sensed the node with the lower user priority may initiate transmission.

7. The non-transitory computer-readable storage medium according to claim 6, wherein the initiation of the transmission procedure comprises contending for channel access.

8. The non-transitory computer-readable storage medium according to claim 7, wherein the initiation of the transmission comprises avoiding collisions between the nodes.

9. The non-transitory computer-readable storage medium according to claim 6, further comprising defining a beacon frame and at least one access phase forming a superframe.

10. The non-transitory computer-readable storage medium according to claim 9, wherein said superframe has at least one access phase mapped for the connected nodes and at least one random access phase for the connected nodes.

11. The non-transitory computer-readable storage medium according to claim 9, wherein said superframe has at least one preamble which all connected nodes are capable of sensing.

12. A node device operative in a time slotted channel access structure in a network, the node device comprising;
a memory configured for storing user priority for an outstanding packet;
based on the user priority, a processor configured for defining a priority for the node;
a first sensor configured for sensing a transmission;
the time slotted channel access structure comprising, at least one access phase;
dividing the access phase into number of access slots;
if the user priority stored in the node is not a highest user priority;
a second sensor configured for sensing in the beginning of the access phase if a transmission from the highest priority node exists;
if no transmission is sensed the node device may initiate transmission.

13. The node device of claim 12, wherein the node device is also configured to act as a hub device coordinating the time slotted channel access structure.

14. The method according to claim 2, wherein the initiation of the transmission procedure comprises contending for channel access.

15. The method according to claim 2, further comprising defining a beacon frame and at least one access phase forming a superframe.

16. The method according to claim 4, wherein said superframe has at least one preamble which all connected nodes are capable of sensing.

17. The method according to claim 1, wherein the initiation of the transmission procedure comprises contending for channel access.

18. The method according to claim 17, wherein the initiation of the transmission comprises avoiding collisions between the nodes.

19. The non-transitory computer-readable storage medium according to claim 6, further comprising:
assigning the access slots to the nodes connected to the network;
after sensing that no transmission from the highest priority node exists, sensing if a transmissions from the assigned node exists;
if no transmission is sensed another node may initiate transmission.

* * * * *